J. Blanchard,
Plow.
No. 113,484. Patented Apr. 11, 1871.
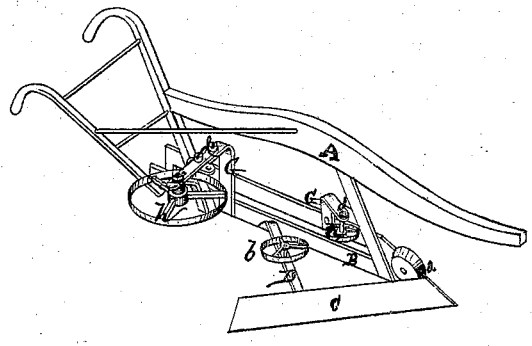
Witnesses
John A. Ellis
J. V. White
Inventor
J. Blanchard
Per,
T. H. Alexander
Atty

UNITED STATES PATENT OFFICE.

JEROME BLANCHARD, OF IOWA FALLS, IOWA.

IMPROVEMENT IN PLOWS.

Specification forming part of Letters Patent No. 113,484, dated April 11, 1871.

*To all whom it may concern:*

Be it known that I, JEROME BLANCHARD, of Iowa Falls, in the county of Hardin and State of Iowa, have invented certain new and useful Improvements in Breaking-Plows; and I do hereby declare the following to be a full, clear, and exact description thereof, reference being had to the accompanying drawing, and to the letters of reference marked thereon.

The nature of my invention consists in the combination and arrangement, with a plow, of wheels for the purpose of turning the sod, in place of and as effectually as the mold-board, thereby overcoming the friction and draft encountered in operating breaking-plows.

In order to enable others skilled in the art to which my invention appertains to make and use the same, I will now proceed to describe its construction and operation, referring to the annexed drawing, which forms a part of this specification, and which represents a perspective view of my improved plow.

A represents the plow-beam, B the landside, and C the share, of a plow. A short distance in rear of the joint, between the landside and share, and attached to the landside, is a small wheel, $a$, the face of which is beveled to an angle corresponding to the face of a mold-board at that point.

D is a flat iron bar connecting the landside and the share, and on said bar is attached the upright shaft or journal of the horizontal wheel $b$.

G G are stiff iron arms attached to the landside B, and to which are attached by adjustable connections $d\ d$ the shafts on the horizontal wheels $h\ h$. By means of these adjustable connections $d\ d$ the wheels $h\ h$ can be thrown forward, back, out, or in, to suit the operator and enable him to lay the sod "flat" or "kinked," as he may choose.

The wheels $b$ and $h\ h$ are made with curved faces to prevent the adhesion of the soil.

Having thus fully described my invention, what I claim as new, and desire to secure by Letters Patent, is—

The combination of the landside B, share C, connecting-bar D, bars G G, with adjustable connections $d\ d$, and the wheels $a\ b$ and $h\ h$, all constructed and arranged substantially as and for the purposes herein set forth.

JEROME BLANCHARD.

Witnesses:
G. WILSON LEWIS,
S. M. WEAVER.